US012622339B2

(12) United States Patent
Long et al.

(10) Patent No.: US 12,622,339 B2

(45) Date of Patent: May 12, 2026

(54) AGRICULTURAL SYSTEMS AND METHODS FOR MONITORING FIELD CONDITIONS

(71) Applicants:CNH Industrial America LLC, New Holland, PA (US); CNH Industrial Canada, Ltd., Saskatoon (CA)

(72) Inventors: David Long, Washington, IL (US); James W. Henry, Saskatoon (CA)

(73) Assignees: CNH Industrial America LLC, New Holland, PA (US); CNH Industrial Canada, Ltd., Saskatoon (CA)

( * ) Notice: Subject to any disclaimer, the term of this patent is extended or adjusted under 35 U.S.C. 154(b) by 431 days.

(21) Appl. No.: 18/219,253

(22) Filed: Jul. 7, 2023

(65) Prior Publication Data

US 2025/0008862 A1 Jan. 9, 2025

(51) Int. Cl.
*A01B 79/00* (2006.01)

(52) U.S. Cl.
CPC .................................. *A01B 79/005* (2013.01)

(58) Field of Classification Search
CPC ......... A01B 35/16; A01B 35/18; A01B 35/28; A01B 39/08; A01B 49/027; A01B 63/1112; A01B 76/00; A01B 79/005
See application file for complete search history.

(56) References Cited

U.S. PATENT DOCUMENTS

| | | | |
|---|---|---|---|
| 8,827,001 B2 | 9/2014 | Wendte et al. | |
| 2009/0101371 A1* | 4/2009 | Melanson | A01B 69/004 |
| | | | 172/6 |
| 2021/0022284 A1* | 1/2021 | Glovier | G07C 5/085 |
| 2021/0132028 A1* | 5/2021 | Foster | G01N 33/24 |
| 2021/0227743 A1* | 7/2021 | Henry | A01B 49/027 |

FOREIGN PATENT DOCUMENTS

| | | |
|---|---|---|
| CN | 102037804 A | 5/2011 |
| CN | 109964569 A | 7/2019 |

* cited by examiner

*Primary Examiner* — Peter D Nolan
*Assistant Examiner* — Ce Li Li
(74) *Attorney, Agent, or Firm* — Dority & Manning. P.A.

(57) ABSTRACT

A system for monitoring field conditions includes a sensor arm pivotably coupled proximate its first end to an agricultural implement and proximate its second end to a sensor configured to generate data indicative of a field condition. Moreover, the system includes an actuator configured to actuate the sensor arm relative to the agricultural implement such that a field of view of the sensor is directed towards a first lateral region of the aft portion of the field when the sensor arm is in a first position and a second lateral region of the aft portion of the field when the sensor arm is in a second position. Additionally, the system includes a computing system configured to control an operation of the actuator to actuate the sensor arm, receive the data generated by the sensor, and determine the field condition of at least the first and second lateral regions.

20 Claims, 9 Drawing Sheets

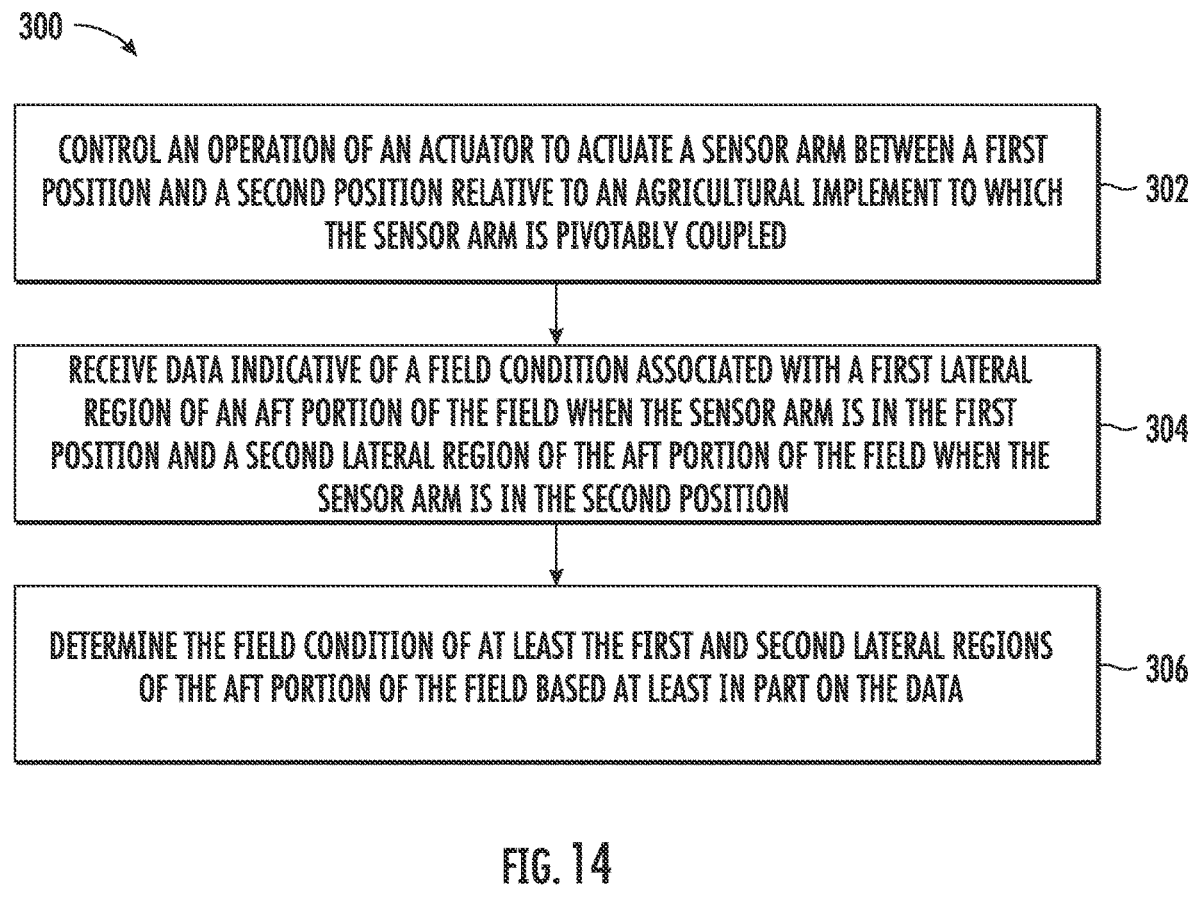

300

CONTROL AN OPERATION OF AN ACTUATOR TO ACTUATE A SENSOR ARM BETWEEN A FIRST POSITION AND A SECOND POSITION RELATIVE TO AN AGRICULTURAL IMPLEMENT TO WHICH THE SENSOR ARM IS PIVOTABLY COUPLED — 302

RECEIVE DATA INDICATIVE OF A FIELD CONDITION ASSOCIATED WITH A FIRST LATERAL REGION OF AN AFT PORTION OF THE FIELD WHEN THE SENSOR ARM IS IN THE FIRST POSITION AND A SECOND LATERAL REGION OF THE AFT PORTION OF THE FIELD WHEN THE SENSOR ARM IS IN THE SECOND POSITION — 304

DETERMINE THE FIELD CONDITION OF AT LEAST THE FIRST AND SECOND LATERAL REGIONS OF THE AFT PORTION OF THE FIELD BASED AT LEAST IN PART ON THE DATA — 306

FIG. 14

AGRICULTURAL SYSTEMS AND METHODS FOR MONITORING FIELD CONDITIONS

FIELD OF THE INVENTION

The present disclosure relates generally to agricultural systems and methods for monitoring field conditions and, more particularly, to systems for monitoring field conditions as an agricultural implement moves across a field.

BACKGROUND OF THE INVENTION

It is well known that, to attain the best agricultural performance from a field, a farmer must cultivate the soil, such as through a tillage operation. Tillage implements typically include one or more ground engaging tools configured to engage the soil as the implement is moved across the field. Such ground engaging tool(s) loosen and/or otherwise agitate the soil to prepare the field for subsequent agricultural operations, such as planting operations. The field conditions after a tillage operation, such as surface roughness and residue coverage, impact subsequent farming operations within the field. In this regard, sensor systems have been developed that allow field conditions to be detected along a portion of the field behind the tillage implement during the tillage operation.

However, conventional sensor systems typically include a fixed sensor having a limited field of view. As such, field conditions may only be captured for a small portion of the field behind the implement. Such issue can potentially be addressed with the use of multiple fixed sensors. However, multi-sensor system arrangements are often prohibitively expensive.

Accordingly, improved agricultural systems and methods for monitoring field conditions as an agricultural implement is moved across a field would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for monitoring field conditions. The agricultural system may include an agricultural implement supporting a plurality of ground-engaging tools configured to engage a field to perform an agricultural operation as the agricultural implement moves across the field along a direction of travel. The agricultural system may further include a sensor configured to generate data indicative of a field condition associated with an aft portion of a field disposed rearward of the agricultural implement relative to the direction of travel of the agricultural implement. Furthermore, the agricultural system may include a sensor arm extending between a first end and a second end, with the sensor arm being pivotably coupled at a pivot joint proximate the first end to the agricultural implement such that the sensor arm is movable relative to the agricultural implement, and with the sensor arm being coupled proximate the second end to the sensor. Moreover, the agricultural system may include an actuator configured to actuate the sensor arm relative to the agricultural implement between a first position and a second position such that a field of view of the sensor is directed towards a first lateral region of the aft portion of the field when the sensor arm is in the first position and a second lateral region of the aft portion of the field when the sensor arm is in the second position, where the second lateral region may be at least partially separate of the first lateral region along a lateral direction. Additionally, the agricultural system may include a computing system, where the computing system may be configured to control an operation of the actuator to actuate the sensor arm between the first and second positions, receive the data generated by the sensor, and determine the field condition of at least the first and second lateral regions of the aft portion of the field based at least in part on the data generated by the sensor.

In an additional aspect, the present subject matter is directed to an agricultural method for monitoring field conditions of a field during the performance of an agricultural operation by ground-engaging tools supported on an agricultural implement. The agricultural method may include controlling, with a computing system, an operation of an actuator to actuate a sensor arm between a first position and a second position, with the sensor arm extending between a first end and a second end, and with the sensor arm being pivotably coupled at a pivot joint proximate the first end to the agricultural implement such that the sensor arm is movable relative to the agricultural implement. The agricultural method may further include receiving, with the computing system, data generated by a sensor coupled to the sensor arm proximate the second end, where the data may be indicative of a field condition associated with a first lateral region of an aft portion of the field when the sensor arm is in the first position and a second lateral region of the aft portion of the field when the sensor arm is in the second position. The second lateral region may be at least partially separate of the first lateral region along a lateral direction, and the aft portion of the field may be disposed rearward of the agricultural implement relative to a direction of travel of the agricultural implement. Additionally, the agricultural method may include determining, with the computing system, the field condition of at least the first and second lateral regions of the aft portion of the field based at least in part on the data generated by the sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 14 illustrates a flow diagram of one embodiment of a method for monitoring field conditions in accordance with aspects of the present subject matter.

Figure 1:
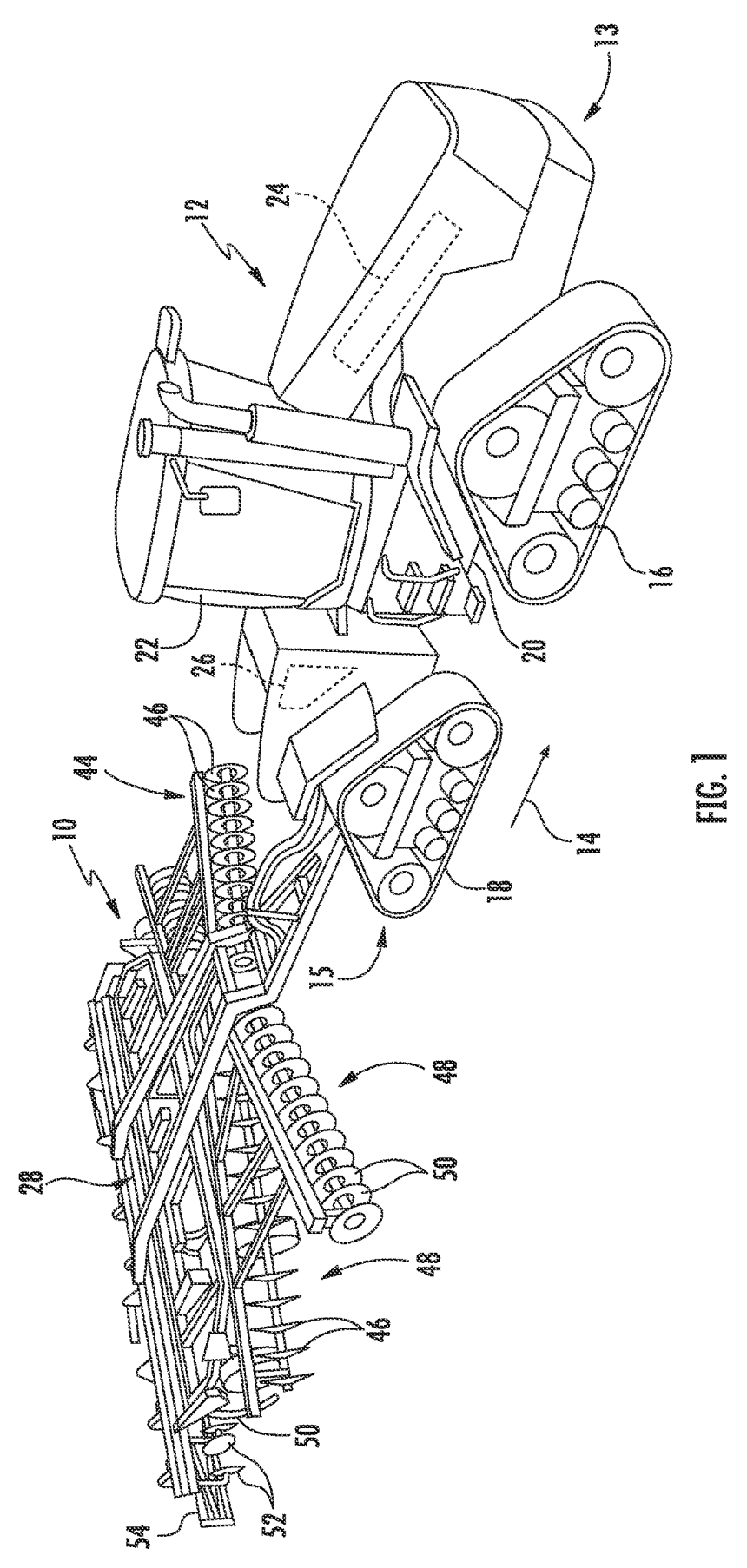
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring field conditions of a field as an agricultural implement moves across the field. Specifically, in several embodiments, a computing device or controller of the disclosed system may be configured to monitor one or more field conditions based on data received from a sensor provided in operative association with an agricultural implement performing an operation within the field. The sensor may have a field of view directed towards a portion of the field such that the sensor generates data indicative of the monitored field condition(s) associated with such portion of the field. Particularly, the sensor may be coupled to a sensor arm pivotably coupled to the agricultural implement such that the sensor arm is movable between a first position and a second position, where the field of view of the sensor is directed towards a first lateral portion of the field when the sensor arm is in the first position and towards a second lateral portion of the field when the sensor arm is in the second position, and where the first and second lateral portions are at least partially separate (e.g., do not fully overlap) along the lateral direction. As such, the sensor may capture data associated with the monitored field condition(s) across a larger area of the field than if the sensor were fixed in position.

In some embodiments, the agricultural implement has at least a first frame section and a second frame section, where the second frame section is pivotable relative to the first frame section, and where the first lateral section is at least partially aligned with the first frame section and where the second lateral section is at least partially aligned with the second frame section. In some instances, the sensor arm is pivotably coupled to a rotational member, where the rotational member is rotatably coupled to the agricultural implement for rotation about a rotational axis, where rotation of the rotational member causes the sensor arm to pivot between the first and second positions. However, in some instances, the sensor arm is part of a parallel linkage assembly such that the sensor is not rotated as the sensor arm moves between the first and second positions. Accordingly, the sensor arm may allow the sensor to capture data aligned with multiple frame sections without interfering with folding of the frame sections.

Figure 2:
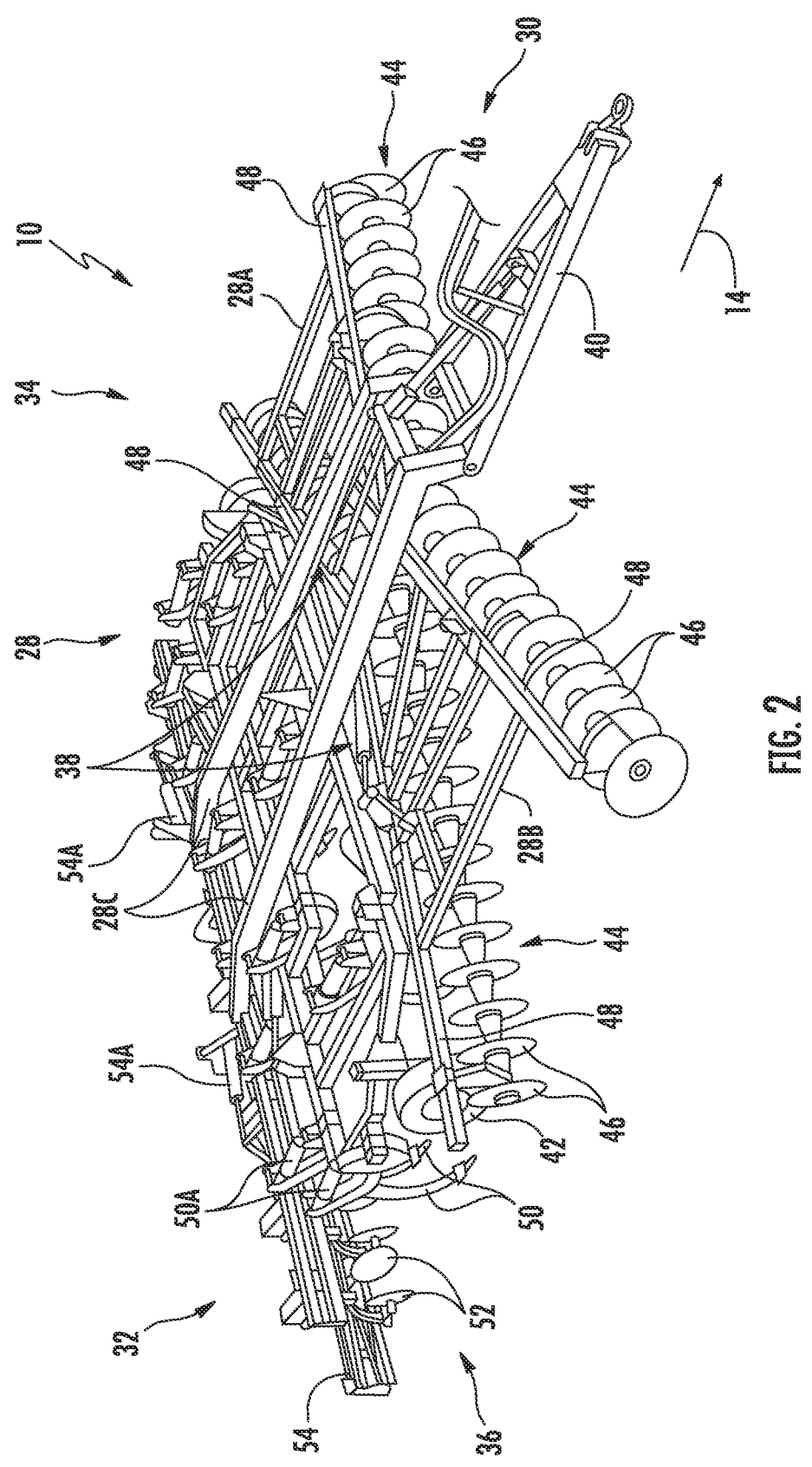
FIG. 2 illustrates another perspective view the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown) positioned at a front end 13 of the work vehicle 12, a pair of rear track assemblies 18 (only one of which is shown) positioned at a rear end 15 of the work vehicle 12, and a frame or chassis 20 coupled to and supported by the track assemblies 16, 18. An operator's cab 22 may be supported by a portion of the chassis 20 and may house various input devices (e.g., a user interface 60 shown in FIG. 12) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend along a longitudinal direction (e.g., as shown with arrow LG1 in FIGS. 3-9 and 11) between a forward end 30 and an aft end 32. The frame 28 may also extend along a lateral direction (e.g., as shown with arrow LT1 in FIGS. 3-9 and 11) between a first side 34 and a second side 36. In this respect, the frame 28 generally includes a plurality of structural frame members, such as beams, bars, and/or the like, configured to support or couple to a plurality of components. Furthermore, in the illustrated embodiments, the frame 28 includes at least a first wing frame section 28A and a second wing frame section 28B connected to opposite sides of a central frame section 28C by a plurality of hinged joints that allow the wing frame sections 28A, 28B to be folded relative to the central frame section 28C such between a folded position for transportation and a working position for performing an agricultural operation within a field. The implement 10 may further be configured to utilize such hinged joints between the wing frame sections 28A, 28B and the central frame section 28C in a manner that allows the wing frame sections 28A, 28B to flex with respect to the central frame section 28C as the implement 10 is towed across the ground surface during tillage operations. One or more wing actuators 38 may be coupled between each of the wing frame sections 28A, 28B and the central frame section 28C and controllable to rotate the wing frame sections 28A, 28B relative to the central frame section 28C about the joints, such as between the folded and transport positions and/or to adjust a down pressure on such frame sections 28A, 28B, 28C.

A hitch assembly 40 may be connected to the frame 28 (e.g., to the central frame section 28C) and be configured to couple the implement 10 to the work vehicle 12. Additionally, a plurality of wheels 42 (one is shown) may be coupled to the frame 28 to facilitate towing the implement 10 in the direction of travel 14. In one or more embodiments, actuators 41 (FIG. 12) may be provided to adjust a position of each of the wheels 42 and the frame 28 to adjust a height of the frame 28 relative to the ground surface.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 or tines (not shown) configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. The implement 10 may further include shank frame actuator(s) 50A and/or basket assembly actuator(s) 54A configured to move or otherwise adjust the orientation or position of the shanks 50 and the basket assemblies 54, respectively, relative to the implement frame 28. It should be appreciated that, in other embodiments, any other suitable ground-engaging tools may be coupled to and supported by the implement frame 28, such as a plurality closing discs.

It should be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
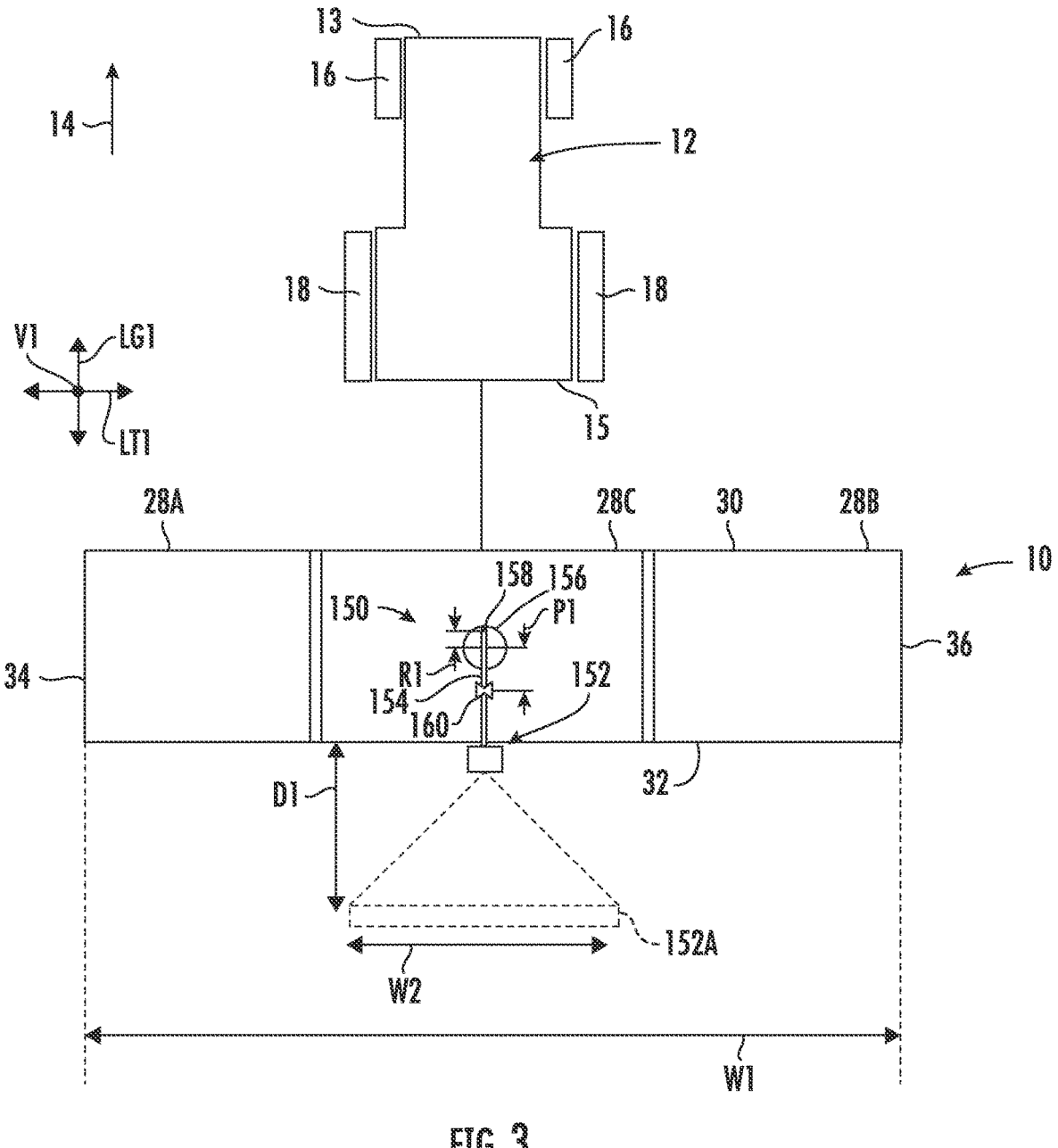
FIG. 3 illustrates a schematic, top down view of an example aspect of a system for monitoring field conditions provided in operative association with the agricultural implement and the work vehicle shown in FIGS. 1 and 2 in accordance with aspects of the present subject matter.

Referring now to FIG. 3, a schematic, top-down view of a sensing assembly 150 provided in operative association with the implement 10 and the work vehicle 12 for monitoring field conditions as the implement 10 is moved across the field is illustrated in accordance with aspects of the present subject matter. As shown in FIG. 3, the sensing assembly 150 may include a sensor 152 supported on the implement 10, with the sensor 152 having a field of view 152A directed towards the field. In one embodiment, the sensor 152 may be supported relative to the implement 10 such that the field of view 152A of the sensor 152 is directed towards an aft portion of the field disposed rearward of the implement 10 relative to the direction of travel 14.

The sensor 152 may be configured to generate data indicative of one or more field conditions associated with the aft portion of the field located behind or aft of the implement 10. For instance, the sensor 152 may be configured to generate data indicative of at least one of a surface roughness, clod size, residue coverage, soil compaction, soil composition, tillage floor levelness, and/or the like of the aft portion of the field. The sensor 152 may be configured as any suitable device, such as a camera(s) (including stereo camera (s), and/or the like), radar sensor(s), ultrasonic sensor(s), LIDAR device(s), infrared sensor(s), and/or the like such that the sensor 152 generates image data, radar data, point-cloud data, infrared data, ultrasound data, and/or the like indicative of one or more monitored field conditions. For instance, the sensor 152 may be configured as a radar sensor(s), an ultrasonic sensor(s), a LIDAR device(s), and/or a camera(s) to generate data indicative of soil roughness. Similarly, the sensor 152 may be configured as a LIDAR device(s) and/or a camera(s) to generate data indicative of clod size, residue coverage, and/or soil moisture. Further, the sensor 152 may be configured as a radar sensor(s), specifically as ground-penetrating radar sensor(s), to generate data indicative of soil compaction and/or tillage floor levelness. In some embodiments, the sensor 152 is particularly configured as a non-contact sensor, configured to be spaced apart from a surface of the field while generating the data indicative of the field condition(s).

In one embodiment, the field of view 152A of the sensor 152 may be narrower than the implement 10 such that the sensor 152 is only configured to capture data associated with a sub-section of the portion of the field located aft or behind the implement 10. More particularly, as shown in FIG. 3, the implement 10 has a lateral width W1 extending between its first and second lateral sides 34, 36, which generally corresponds to the width of a swath of the field across which the implement 10 is configured to work the soil during the performance of the associated agricultural operation. In contrast, the field of view 152A of the sensor 152 extends across a width W2 that is less than the lateral width W1 of the implement 10 or worked field swath. For instance, in the embodiment shown, the width W2 of the field of view 152A corresponds to about one third of the width W1 of the implement/swath. However, it should be appreciated that, in other embodiments, the width W2 of the field of view 152A may correspond to any other suitable portion of the width W1 of the implement/swath, such as, for example, a quarter of the width W1, a half of the width W1, and/or the like. Thus, as the implement 10 is moved across the field, the sensor 152 is only configured to capture data associated with a portion of the field spanning across the width W1 of the implement 10.

As such, in accordance with aspects of the present subject matter, the sensor 152 may be movably supported on and/or relative to the implement 10 by a support arm 154 (also referred to herein as "sensor arm 154"). Particularly, the support arm 154 may extend between a first end and a second end, with the support arm 154 being pivotally coupled proximate the first end to the agricultural implement 10 and coupled proximate the second end to the sensor 152. In some embodiments, the support arm 154 is pivotably coupled to a rotational member 156 (e.g., plate, disk, etc.) where the rotational member 156, in turn, is rotatably coupled to the agricultural implement 10 for rotation about a central rotational axis C1 (FIGS. 4-7), which extends substantially along a vertical direction V1 (e.g., perpendicular to the lateral and longitudinal directions LT1, LG1). More particularly, the support arm 154 is pivotably coupled proximate the first end to the rotational member 156 by a pivot joint 158 at a location radially spaced apart from the central rotational axis C1. The support arm 154 may be additionally supported between the first and second ends relative to the agricultural implement 10 by a fulcrum member 160 coupled to the agricultural implement 10, with the fulcrum member 160 being spaced apart from the central rotational axis C1. For instance, the support arm 154 may be movably coupled to the fulcrum member 160 and/or the fulcrum member may be movably coupled to the agricultural implement 10 such that the support arm 154 may move relative to the agricultural implement 10 at the fulcrum member 160 as the rotational member 156 rotates. The fulcrum member 160, for instance, may include sleeve rotatably coupled to the agricultural implement 10, with the support arm 154 extending through the sleeve. In the illustrated embodiment, the fulcrum member 160 and the central rotational axis C1 are substantially aligned along the longitudinal direction LG1. However, in other embodiments, the fulcrum member 160 and the central rotational axis C1 may be otherwise positioned. Supporting the support arm 154 for rotation relative to the agricultural implement 10 at multiple locations (i.e., at both the rotational member 156 and the fulcrum member 160) reduces the impact of vibration on the data generated by the sensor 152.

The sensing assembly 150 may further include an actuator 164 (FIG. 12) provided in operative association with the rotational member 156 and/or the support arm 154. For instance, the actuator 164 (FIG. 12) may be configured to rotate the rotational member 156 relative to the implement 10 which causes the sensor arm 154 (and sensor 152) to move relative to the implement 10 such that the field of view 152A of the sensor 152 can be moved across all or a given portion of the width W1 of the implement/swath, thereby allowing data to be captured across a larger portion of the width W1 than if the sensor 152 was stationary. For example, when the support arm 154 is pivotably coupled to the central frame section 28C, the rotational member 156 is in the rotational position shown in FIG. 3 (referred to herein as a "noon" or 0° position), the distance between the pivot joint 158 and the central rotational axis C1 (FIGS. 4-6) in a radial direction is equal to a first radial distance R1, and a distance between the fulcrum member 160 and the central rotational axis C1 (FIGS. 4-6) is equal to a first distance P1, the field of view 152A of the sensor 152 is directed to a central lateral region of the aft portion of the field at a first distance D1 aft of the implement 10 relative to the direction of travel 14. The central lateral region is primarily aligned along the direction of travel 14 with the frame section (i.e., the central frame section 28C) to which the support arm 154 is coupled. For instance, in the embodiment shown, the central lateral region is exclusively behind the central frame section 28C along the direction of travel 14. However, in some instances, the central lateral region may also be partially aligned with one of the other frame sections (e.g., the first wing frame section 28A or the second wing frame section 28B).

Figures 4, 5, 6:
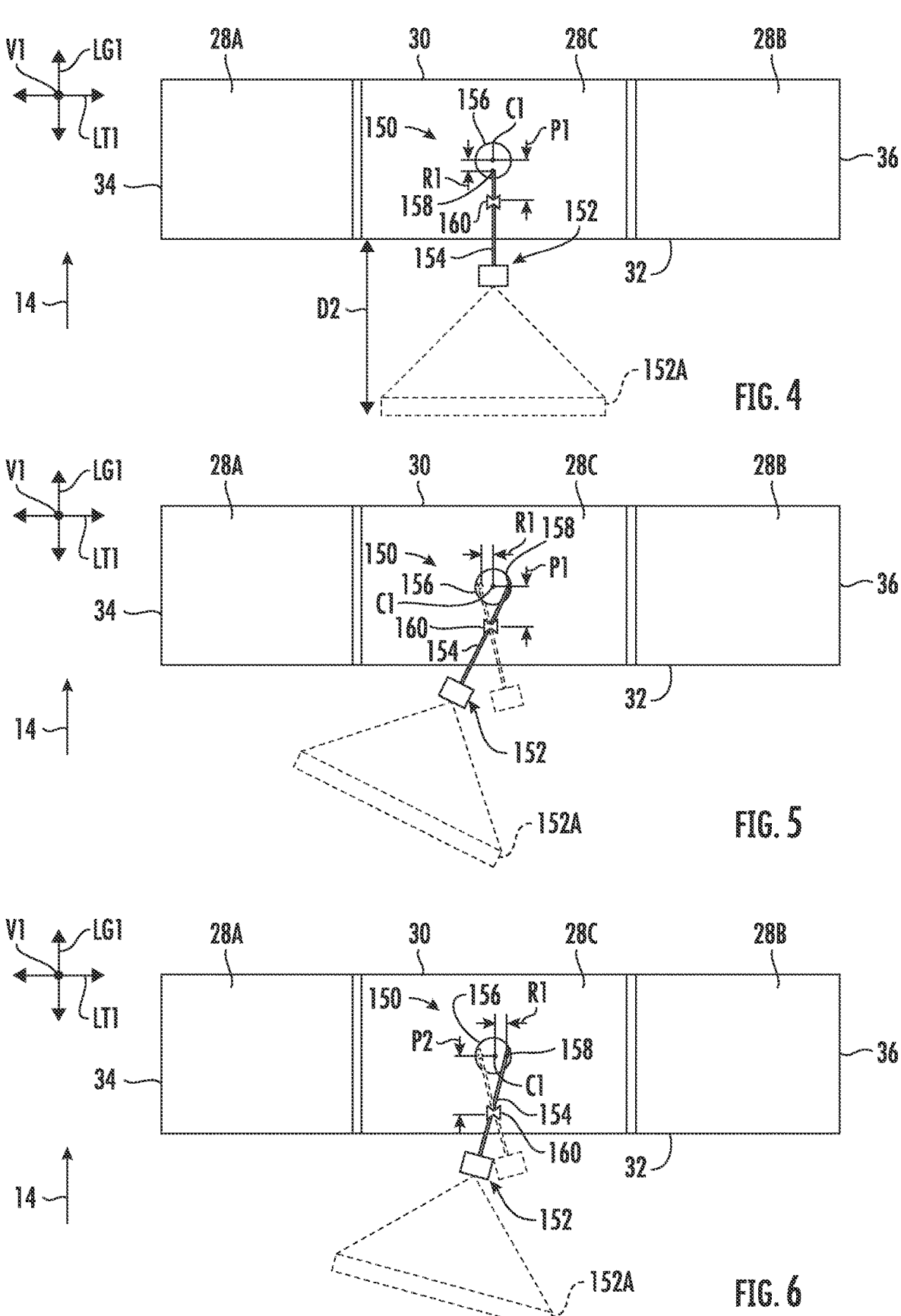
FIGS. 4 and 5 illustrate schematic, top down views of the system shown in FIG. 3, particularly illustrating different positions of a sensor arm of the system in accordance with aspects of the present subject matter.
FIG. 6 illustrates a schematic, top down view of the system shown in FIG. 5, particularly illustrating an adjustable fulcrum for the sensor arm of the system in accordance with aspects of the present subject matter.

When the rotational member 156 is rotated to the rotational position shown in FIG. 4 (referred to herein as a "six o'clock" or 180° position), the field of view 152A of the sensor 152 is directed to a similar central lateral region of the aft portion of the field, except that the central lateral region of FIG. 4 is at a second distance D2 aft of the implement 10 relative to the direction of travel 14, where the second distance D2 is larger than the first distance D1. When the rotational member 156 is rotated to the rotational position shown in solid lines in FIG. 5 (referred to herein as a "3 o'clock" or 90° position), the field of view 152A of the sensor 152 is directed to a region of the aft portion of the field that is aligned with both the first wing frame section 28A and the central frame section 28C along the direction of travel 14, with such region being at least partially offset or separate along the lateral direction LT1 from the lateral region of the aft portion of the field within the field of view 152A when the rotational member 156 is in the 0° position (FIG. 3) and the 180° position (FIG. 4). Similarly, when the rotational member 156 is rotated to the rotational position shown in dashed lines in FIG. 5 (referred to herein as a "9 o'clock" or 270° position), while not shown, the field of view 152A of the sensor 152 is directed to a region of the aft portion of the field that is aligned with both the second wing frame section 28B and the central frame section 28C along the direction of travel 14, with such region being at least partially offset or separate along the lateral direction LT1 from the lateral region of the aft portion of the field within the field of view 152A when the rotational member 156 is in the 0° position (FIG. 3) and the 180° position (FIG. 4), in an opposite direction from the 90° position (FIG. 5).

It should be appreciated that the length of the sensor arm 154 and/or the radial distance between the pivot joint 158 and the central rotational axis C1 may be selected such that the lateral region of the aft portion of the field within the field of view 152A when the rotational member 156 is in the 90° position (FIG. 5) or the 270° position (FIG. 5) may overlap more with the respective wing frame section 28A, 28B than the central frame section 28C along the direction of travel. For instance, the length of the sensor arm 154 and/or the radial distance R1 may be selected such that the lateral region of the aft portion of the field within the field of view 152A when the rotational member 156 is in the 90° position (FIG. 5) or the 270° position (FIG. 5) may overlap with only the wing frame section 28A, 28B.

It should also be appreciated that, in some instances, the distance between the fulcrum member 160 and the central rotational axis C1 is adjustable and/or the distance between the pivot joint 158 and the central rotational axis C1 is adjustable such that the lateral region of the aft portion of the field within the field of view 152A when the rotational member 156 is in the 90° position (FIG. 5) or the 270° position (FIG. 5) may overlap more with the respective wing frame section 28A, 28B than the central frame section 28C along the direction of travel 14. Generally, the further the fulcrum member 160 is from the central rotational axis C1 along the longitudinal direction LG1, the smaller the lateral distance between the 90° and 270° positions of the second end of the sensor arm 154 (and thus, the sensor 152). For instance, the agricultural implement 10 may have a plurality of holes (not shown) spaced apart at least in longitudinal direction LG1 of the implement 10 (e.g., perpendicular to the lateral direction LT1), a slot (not shown) extending at least partially along the longitudinal direction LG1 *n* of the implement 10, and/or the like for coupling the fulcrum member 160 to the implement 10 such that the distance between the fulcrum member 160 and the central rotational axis C1 is adjustable along at least the longitudinal direction LG1. For example, as shown in FIG. 6, the distance between the fulcrum member 160 and the central rotational axis C1 is adjusted to a second distance P2, where the second distance P2 is greater than the first distance P1 (FIGS. 3-5), which causes the lateral distance between the 90° and 270° positions of the second end of the sensor arm 154 (and thus, the sensor 152) corresponding to the second distance P2 to be smaller than for the first distance P1 (FIGS. 3-5).

Figures 7, 8, 9:
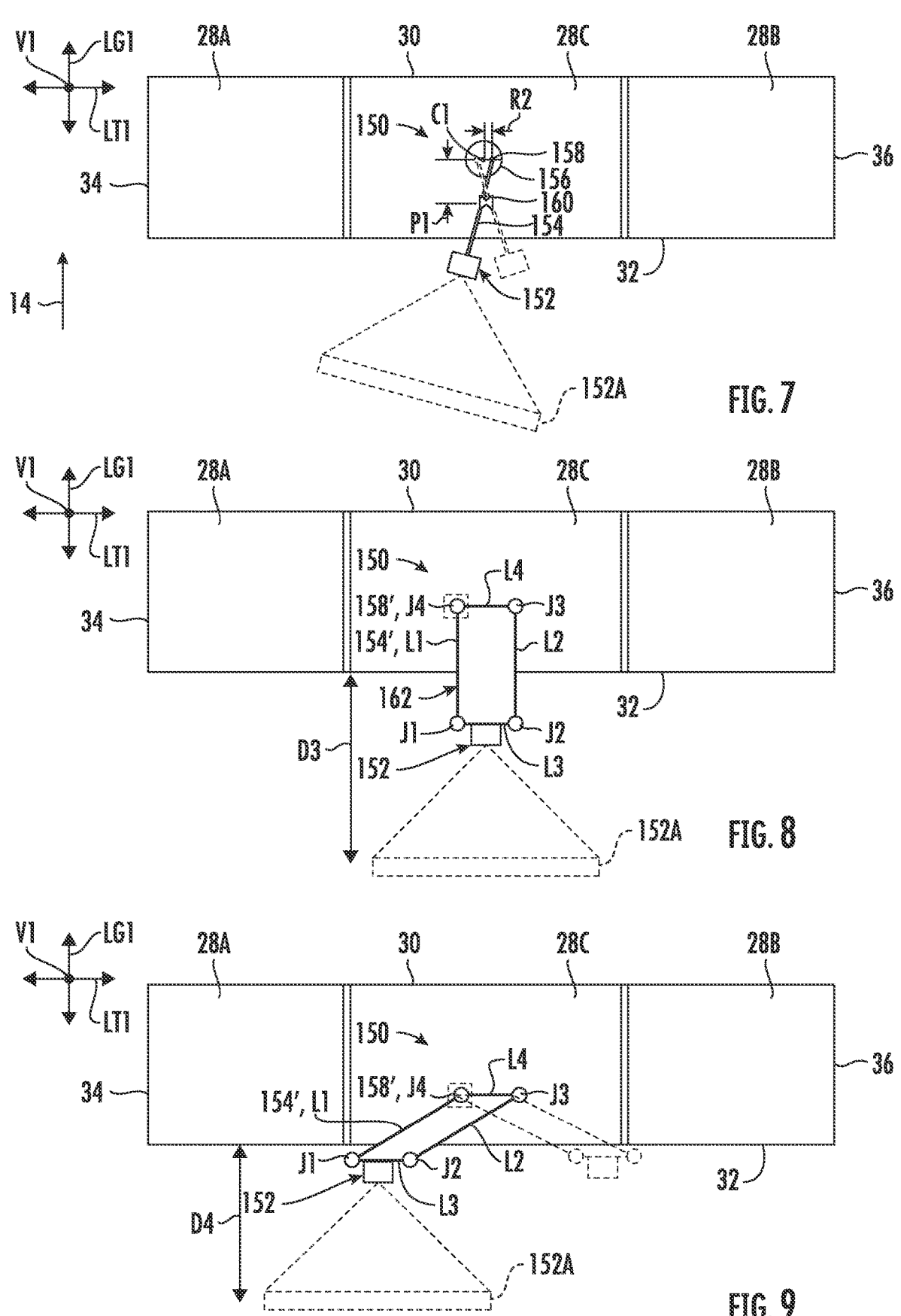
FIG. 7 illustrates a schematic, top down view of the system shown in FIG. 5, particularly illustrating an adjustable radial position for the sensor arm of the system in accordance with aspects of the present subject matter.
FIG. 8 illustrates a schematic, top down view of another example aspect of the system for monitoring field conditions provided in operative association with the agricultural implement and the work vehicle shown in FIGS. 1 and 2 in accordance with aspects of the present subject matter.
FIG. 9 illustrates a schematic, top down view of the system shown in FIG. 8, particularly illustrating different positions of a sensor arm of the system in accordance with aspects of the present subject matter.

Similarly, the closer the pivot joint 158 is radially from the central rotational axis C1, the smaller the lateral distance between the 90° and 270° positions of the second end of the sensor arm 154 (and thus, the sensor 152). For instance, the rotational member 156 may have a plurality of holes (not shown) spaced apart at least in radial direction, a slot (not shown) extending at least partially along the radial direction, and/or the like for coupling the sensor arm 154 (e.g., the pivot joint 158) to the rotational member 156 such that the distance between the pivot joint 158 and the central rotational axis C1 is adjustable along at least the radial direction relative to the central rotational axis C1. For example, as shown in FIG. 7, the distance between the pivot joint 158 and the central rotational axis C1 is adjusted to a second radial distance R2, where the second radial distance R2 is smaller than the first radial distance R1 (FIGS. 3-6), which causes the lateral distance between the 90° and 270° positions of the second end of the sensor arm 154 (and thus, the sensor 152) corresponding to the second radial distance R2 to be smaller than for the first radial distance R1 (FIGS. 3-6).

It should be appreciated that, in some embodiments, the sensor assembly 150 may include an additional actuator or actuators for adjusting the distance between the fulcrum member 160 and the central rotational axis C1 and/or the distance between the pivot joint 158 and the central rotational axis C1. It should additionally be appreciated that a position sensor (not shown), such as an angular potentiometer, and/or the like, may be provided in addition to, or as part of, the actuator 164, such that the position of the rotational member 156 (and thus, the position of the support arm 154 and sensor 152) relative to the implement 10 may be monitored.

In some instances, a sensor arm 154' supporting the sensor 152 on the agricultural implement 10 may be part of a linkage assembly 162. For instance, as shown in FIGS. 8-9, a linkage assembly includes a first link L1, a second link L2, a third link L3, and a fourth link L4. The first and third links L1, L3 are pivotably coupled together at a first joint J1, the second and third links L2, L3 are pivotably coupled together at a second joint J2, the second and fourth links L2, L4 are pivotably coupled together at a third joint J3, and the first and fourth links L1, L4 are pivotably coupled together at a fourth joint J4, and with the link L4 being fixed relative to the implement 10 (e.g., by the third and fourth joints J3, J4). The sensor arm 154' may be, for example, the first link L1, where the sensor arm 154' is coupled proximate the first end to the fourth joint J4 to the implement 10 (e.g., to the central frame section 28C) and proximate the second end to the sensor 152 (e.g., with the sensor 152 being supported on the third link L3). In one embodiment, the linkage assembly is a parallel linkage assembly, where the first and second links L1, L2 are substantially equal in length, and the third and fourth links L3, L4 are similarly, substantially equal in length, such that the first link L1 remains substantially parallel to the second link L2 and the third link L3 stays substantially parallel to the fixed fourth link L4 as the first and second links L1, L2 pivot or rotate about the third and fourth joints J3, L4. Accordingly, in such embodiment, the sensor 152 does not pivot or rotate as the sensor arm 154' is pivoted about the joint J4.

The sensor arm 154' is rotatable or pivotable about the joint J4 (e.g., by the actuator 164 (FIG. 12)). In the position shown in FIG. 8, the field of view 152A of the sensor 152 is directed to a central lateral region of the aft portion of the field at a third distance D3 aft of the implement 10 relative to the direction of travel 14. The central lateral region is primarily aligned along the direction of travel 14 with the frame section (i.e., the central frame section 28C) to which the support arm 154' is coupled. For instance, in the embodiment shown, the central lateral region is exclusively behind the central frame section 28C along the direction of travel 14. However, in some instances, the central lateral region may also be partially aligned with one of the other frame sections (e.g., the first wing frame section 28A or the second wing frame section 28B).

When the sensor arm 154' is pivoted about the joint J4 to the position shown in solid lines in FIG. 9, the field of view 152A of the sensor 152 is directed to a region of the aft portion of the field that is aligned with both the first wing frame section 28A and the central frame section 28C along the direction of travel 14 and at least partially offset or separate along the lateral direction LT1 from the lateral region of the aft portion of the field within the field of view 152A when the support arm 154' is in the position shown in FIG. 8. Similarly, when the sensor arm 154' is pivoted about the joint J4 to the position shown in dashed lines in FIG. 9, while not shown, the field of view 152A of the sensor 152 is directed to a region of the aft portion of the field that is aligned with both the second wing frame section 28B and the central frame section 28C along the direction of travel 14 and at least partially offset or separate along the lateral direction LT1 from the lateral region of the aft portion of the field within the field of view 152A when the support arm 154' is in the position shown in FIG. 8, in an opposite direction from the solid lines position of FIG. 9.

It should again be appreciated that the length of the sensor arm 154' may be selected such that the lateral region of the aft portion of the field within the field of view 152A when the support arm 154' is in the positions shown in FIG. 9 may overlap more with the respective wing frame section 28A, 28B than the central frame section 28C along the direction of travel. For instance, the length of the sensor arm 154' may be selected such that the lateral region of the aft portion of the field within the field of view 152A when the support arm 154' is in the positions shown in FIG. 9 may overlap with only the respective wing frame section 28A, 28B. It should further be appreciated that the sensor arm 154' may instead be the second link L2, in a similar manner. Moreover, it should be appreciated that by supporting the sensor 152 by the linkage assembly described, the impact of vibration on the data generated by the sensor 152 is reduced. Additionally, it should again be appreciated that the actuated position of the support arm 154' relative to the implement 10 (and thus, the aft portion of the field) may be monitored by a position sensor (not shown) provided in addition to, or as part of, the actuator 164.

Figure 10:
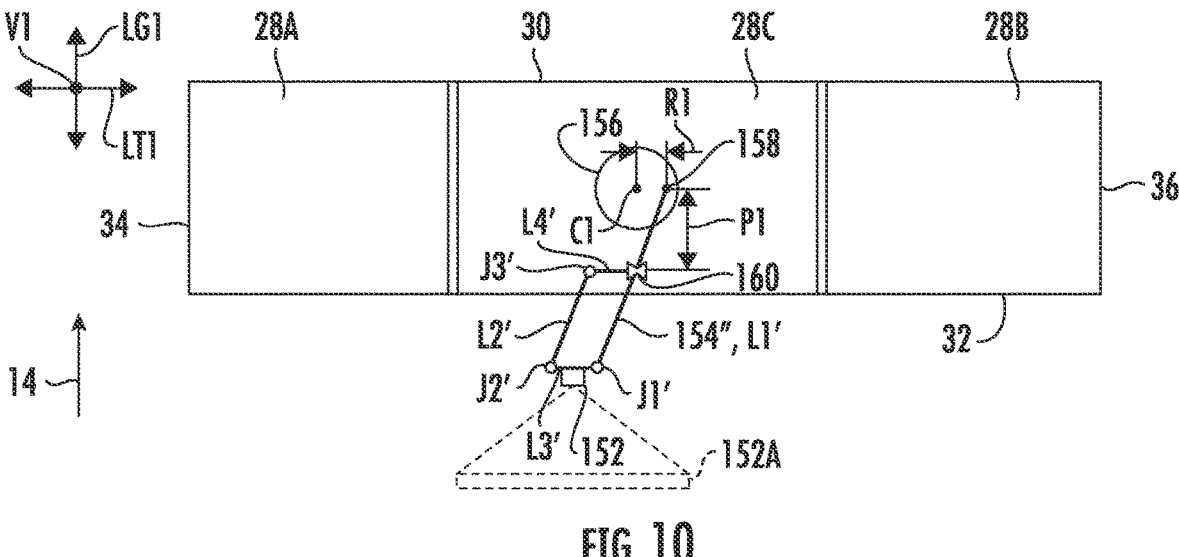
FIGS. 10-11 illustrate a schematic, top down view of another example aspect of the system for monitoring field conditions provided in operative association with the agricultural implement and the work vehicle shown in FIGS. 1 and 2 in accordance with aspects of the present subject matter.
Figure 11:
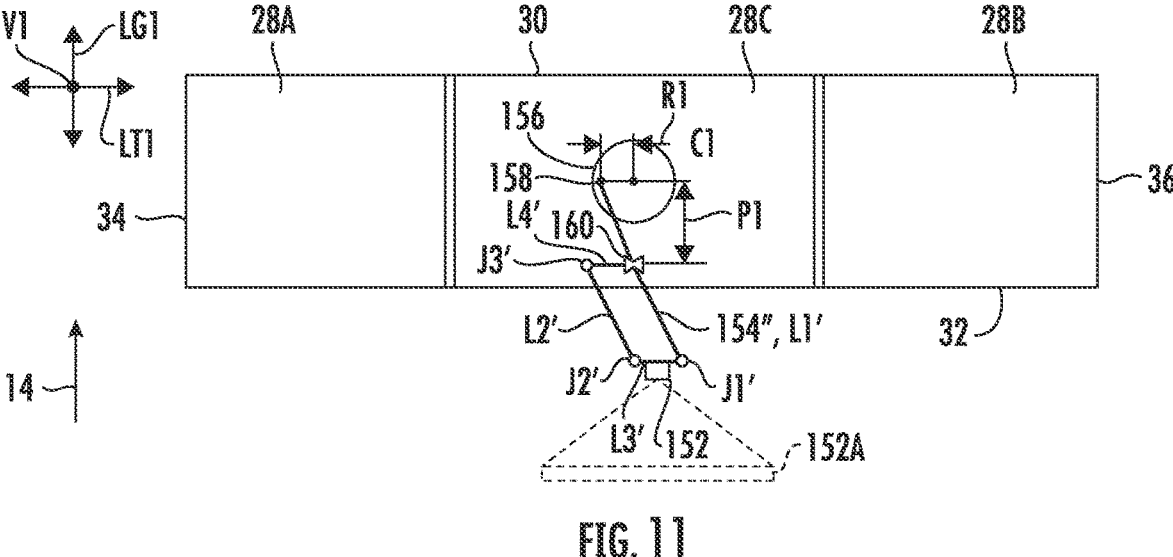

In some instances, a combination of the sensor assembly configuration shown in FIGS. 3-7 and the sensor assembly configuration shown in FIGS. 8-9 may be used to support the sensor 152 on the agricultural implement 10. For instance, as shown in FIGS. 10-11, the combined assembly includes the rotational member 156 rotatably coupled to the implement 10 (e.g., to the central frame section 28C) for rotation about the central rotational axis C1 and the fulcrum member 160 coupled to the agricultural implement 10 (e.g., to the central frame section 28C), with the fulcrum member 160 being spaced apart from the central rotational axis C1. Further, the combined assembly includes a linkage assembly includes a first link L1', a second link L2', a third link L3', and a fourth link L4'. The first and third links L1', L3' are pivotably coupled together at a first joint J1', the second and third links L2', L3' are pivotably coupled together at a second joint J2', and the second and fourth links L2', L4' are pivotably coupled together at a third joint J3', with the third joint J3' being movable relative to the implement 10. Moreover, the fourth link L4' is fixed proximate the end opposite the third joint J3' to the fulcrum member 160. The first link L1' may be the sensor arm 154", where the sensor arm 154" is coupled proximate its first end at the pivot joint 158 to the rotational member 156 and proximate its second end at the first joint J1' to the sensor 152 (e.g., with the sensor 152 being supported on the third link L3'). In one embodiment, the linkage assembly is a parallel linkage assembly, where the first and second links L1', L2' are substantially equal in length, and the third and fourth links L3', L4' are similarly, substantially equal in length, such that the first link L1' remains substantially parallel to the second link L2' and the third link L3' stays substantially parallel to the fourth link L4' as the first and second links L1', L2' pivot or rotate with rotation of the rotational member 156 (e.g., by the actuator 164 (FIG. 12)). Accordingly, in such embodiment, the sensor 152 does not pivot or rotate as the sensor arm 154" is pivoted about the pivot joint 158.

The linkage assembly of the combined assembly of FIGS. 10-11 moves substantially similar to the linkage assembly described above with reference to FIGS. 8-9. For instance, in the rotational position of the rotational member 156 shown in FIG. 10, the field of view 152A of the sensor 152 is directed to a first region of the aft portion of the field that is aligned with both the first wing frame section 28A and the central frame section 28C along the direction of travel 14 and at least partially offset or separate along the lateral direction LT1 from a second lateral region of the aft portion of the field within the field of view 152A when the rotational member 156 is in the rotational position shown in FIG. 11. It should be appreciated that, in the examples shown in FIGS. 10-11, the distance between the pivot joint 158 and the central rotational axis C1 in the radial direction is equal to the first radial distance R1, and the distance between the fulcrum member 160 and the central rotational axis C1 is equal to the first distance P1. However, the length of the second link L2' may be adjustable such that the radial distance between the pivot joint 158 and the central rotational axis C1 in the radial direction and/or the distance between the fulcrum member 160 and the central rotational axis C1 may be adjustable as described above with reference to FIGS. 4-6.

Generally, it should be appreciated that the different aspects of the sensing assembly 150 shown in FIGS. 3-11 allows the sensor 152 to capture data associated with the monitored field condition(s) across a larger area of the field than if the sensor 152 were fixed in position. Particularly, by supporting the sensor 152 relative to the agricultural implement 10 via the support arm 154, 154', the sensor arm 154, 154' allows the sensor 152 to capture data aligned with multiple frame sections 28A, 28B, 28C without interfering with folding of the wing frame sections 28A, 28B relative to the central frame section 28C.

It should be appreciated that the sensing assembly 150 may be similarly supported on one of the wing frame sections 28A, 28B. It should also be appreciated that, while the sensing assembly 150 is shown as having only one sensor 152 in FIGS. 3-11, the sensing assembly 150 may have any other suitable number of rearward sensors 152, such as two or more rearward sensors 152. Further, in alternative embodiments, the sensing assembly 150 may be supported at any other suitable location on the implement 10 and/or the towing vehicle 12 such that the field of view 152A of the sensor 152 is directed towards any other suitable portion of the field. For instance, in one embodiment, the sensing assembly 150 may be supported adjacent the forward end of the implement 10 or the aft end of the vehicle 12 such that the field of view 152A of the sensor 152 is directed towards a portion of the field positioned immediately forward of the implement 10 (or immediately behind the vehicle 12) relative to the direction of travel 14 to generate data indicative of the field immediately before the operation of the agricultural implement 10. In another embodiment, the sensing assembly 150 may be supported adjacent the forward end of the vehicle 12 such that the field of view 152A of the sensor 152 is directed towards a portion of the field positioned immediately forward of the vehicle 12 relative to the direction of travel 14 to generate data indicative of the field before the operation of the agricultural implement 10.

Figure 12:
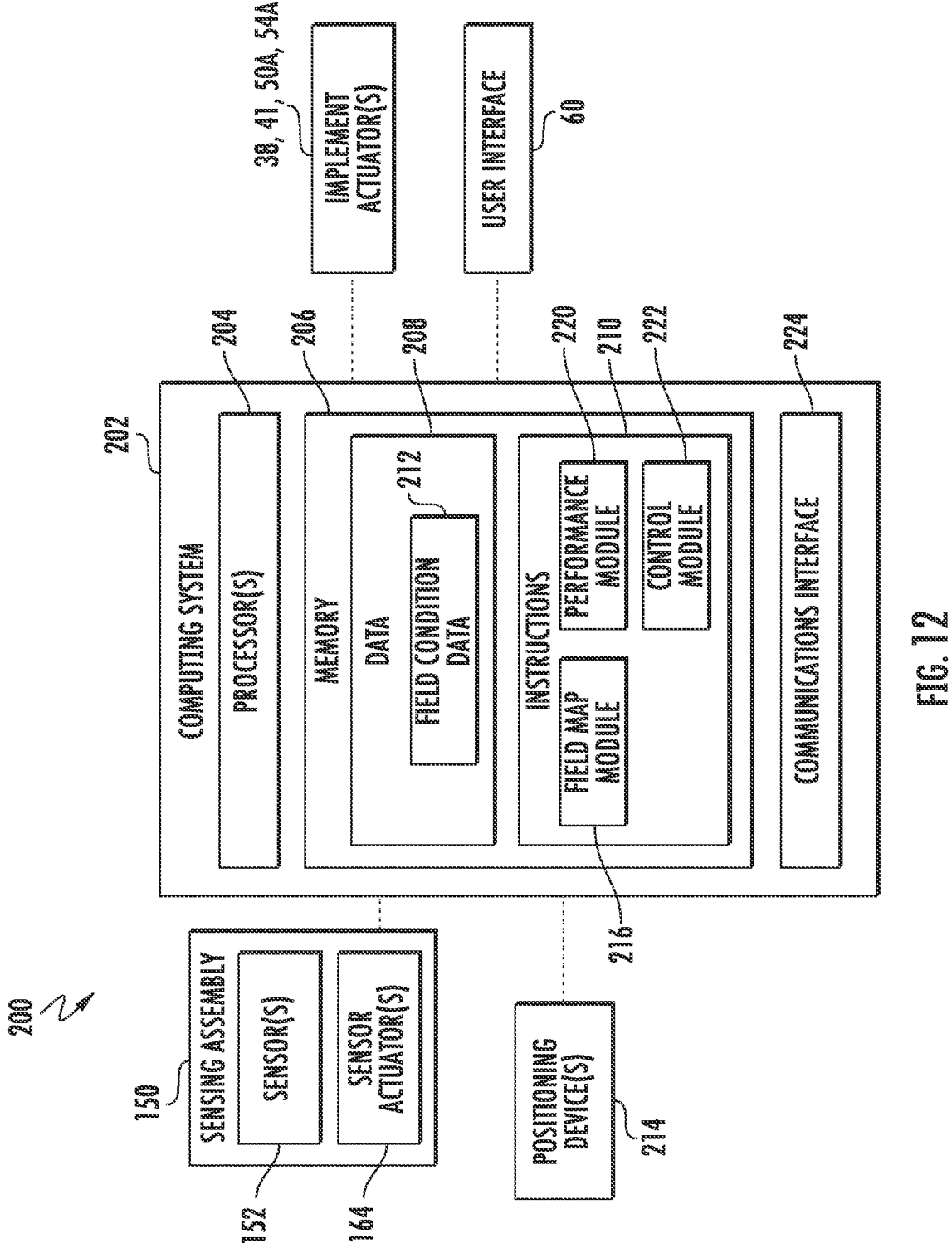
FIG. 12 illustrates a schematic view of a system for monitoring field conditions in accordance with aspects of the present subject matter.

Referring now to FIG. 12, a schematic view of one embodiment of a system 200 for monitoring field conditions as an agricultural implement is moved across a field is illustrated in accordance with aspects of the present subject matter. In general, the system 200 will be described herein with reference to the implement 10 and the work vehicle 12 described above with reference to FIGS. 1-3, as well as the sensing assembly 150 described above with reference to FIGS. 3-9. However, it should be appreciated by those of ordinary skill in the art that the disclosed system 200 may generally be utilized with work vehicles having any suitable vehicle configuration, implements having any suitable implement configuration, and/or with sensing assemblies having any other suitable assembly configuration. Additionally, it should be appreciated that, for purposes of illustration, communicative links or electrical couplings of the system 200 shown in FIG. 12 are indicated by dashed lines.

In several embodiments, the system 200 may include a computing system 202 and various other components configured to be communicatively coupled to and/or controlled by the computing system 202, such as a sensing assembly (e.g., sensing assembly 150) having one or more sensors configured to capture field conditions of a field (e.g., sensor (s) 152) and one or more sensor actuators (e.g., sensor actuator(s) 164), a user interface (e.g., user interface 60), and/or various components of the implement 10 and/or the work vehicle 12 (e.g., implement actuator(s) 38, 41, 50A, 54A). The user interface(s) 60 may include, without limitation, any combination of input and/or output devices that allow an operator to provide operator inputs to the computing system 202 and/or that allow the computing system 202 to provide feedback to the operator, such as a keyboard, keypad, pointing device, buttons, knobs, touch sensitive screen, mobile device, audio input device, audio output device, and/or the like. Additionally, the computing system 202 may be communicatively coupled to one or more positioning devices 214 configured to generate data indicative of the location of the agricultural implement 10 and/or work vehicle 12, such as a satellite navigation positioning device (e.g., a GPS system, a Galileo positioning system, a Global Navigation satellite system (GLONASS), a BeiDou Satellite Navigation and Positioning system, a dead reckoning device, and/or the like).

In general, the computing system 202 may correspond to any suitable processor-based device(s), such as a computing device or any combination of computing devices. Thus, as shown in FIG. 12, the computing system 202 may generally include one or more processor(s) 204 and associated memory devices 206 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

It should be appreciated that the computing system 202 may correspond to an existing controller for the implement 10 or the vehicle 12 or may correspond to a separate processing device. For instance, in one embodiment, the computing system 202 may form all or part of a separate plug-in module that may be installed in operative association with the implement 10 or the vehicle 12 to allow for the disclosed system and method to be implemented without requiring additional software to be uploaded onto existing control devices of the implement 10 or the vehicle 12.

In several embodiments, the data 208 may be stored in one or more databases. For example, the memory 206 may include a field condition database 212 for storing field condition data received from the sensor(s) 152. For instance, the sensor(s) 152 may be configured to continuously or periodically capture data associated with a portion of the field, such as immediately before and/or after the performance of an agricultural operation within such portion of the field. In such an embodiment, the data transmitted to the computing system 202 from the sensor(s) 152 may be stored within the field condition database 212 for subsequent processing and/or analysis. It should be appreciated that, as used herein, the term field condition data 212 may include any suitable type of data received from the sensor(s) 152 that allows for the field conditions of a field to be analyzed, including photographs or other images, RADAR data, LIDAR data, and/or other image-related data (e.g., scan data and/or the like). It should be appreciated that, in several embodiments, the field condition data 212 may be cross-referenced with corresponding position location relative to the implement 10 (e.g., actuated position by the actuator 164) and/or geo-referenced or may otherwise be stored with corresponding location data generated by the positioning device(s) 214 associated with the specific location at which such data was collected within the field.

Figure 13:
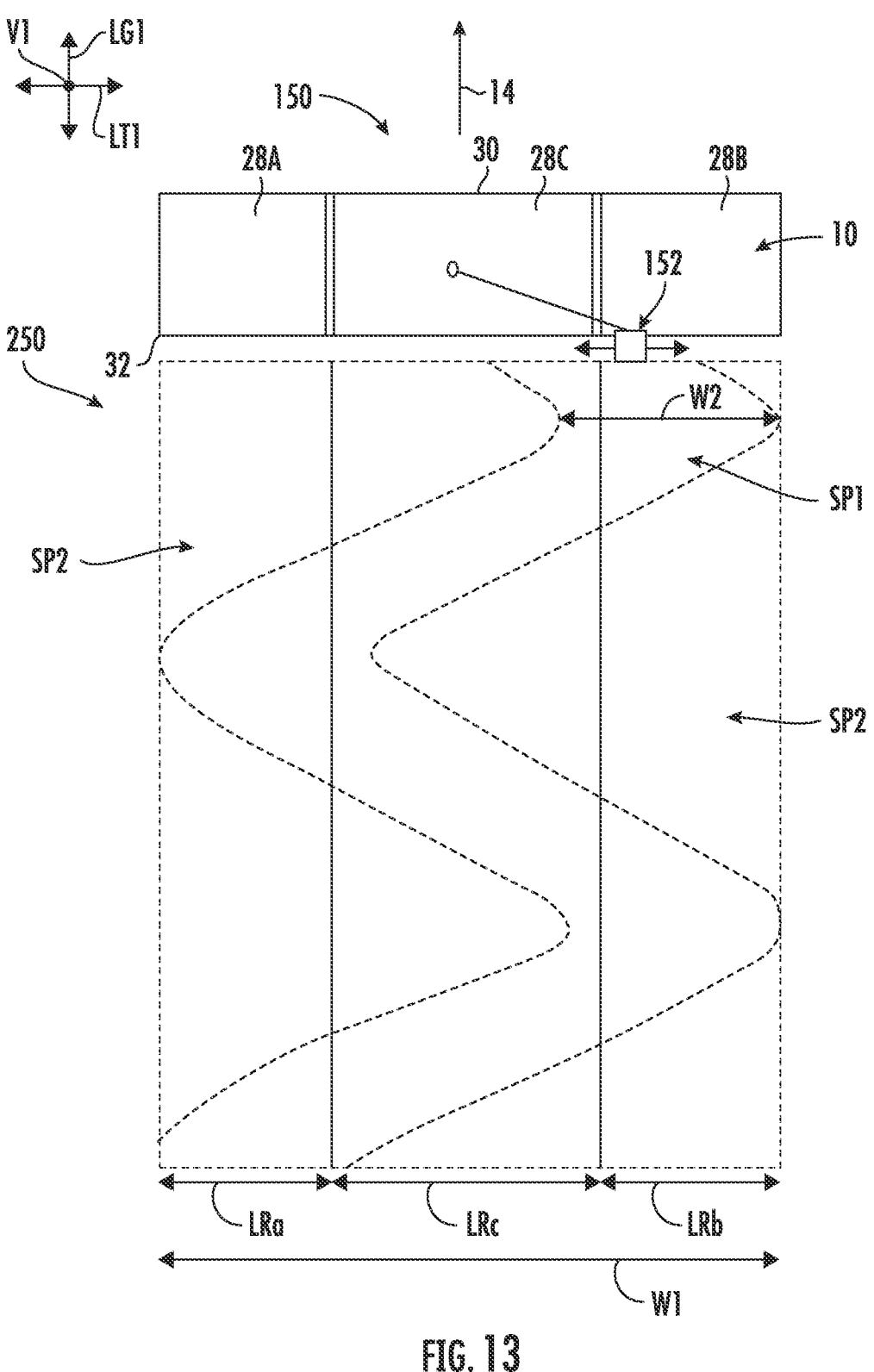
FIG. 13 illustrates another example view of an example map of the portion of a field adjacent to an aft end of an agricultural implement generated in accordance with aspects of the present subject matter.

Referring still to FIG. 12, in several embodiments, the instructions 210 stored within the memory 206 of the computing system 202 may be executed by the processor(s) 204 to implement a field map module 216. In general, the field map module 216 may be configured to analyze the field condition data 212 deriving from the sensor(s) 152 to generate a field condition map for the field. For instance, referring briefly to FIG. 13, an example map 250 of the portion of a field adjacent to an aft end of an agricultural implement is illustrated in accordance with aspects of the present subject matter. As shown in FIG. 13, the sensor 152 of the sensing assembly 150 is actuated back and forth (e.g., automatically by the sensor actuator(s) 164 (FIG. 12)) relative to the aft end 32 of the implement 10 such that its field of view 152A is oscillated back and forth along the width W1 of the implement/swath while the implement 10 is moved across the field. In some embodiments, the sensor 152 is continuously actuated back and forth at a relatively constant speed such that the sensor 152 may generally generate data corresponding to a first sub-portion SP1 of the swath. The first sub-portion SP1 may span across different lateral regions of the swath associated with different frame sections 28A, 28B, 28C. For instance, the first sub-portion SP1 may include a first lateral region LRa associated or aligned with the first wing frame section 28A along the direction of travel 14, a second lateral region LRb associated or aligned with the second wing frame section 28B along the direction of travel 14, and a third or central lateral region LRc associated or aligned with the central frame section 28C. The field map module 216 may interpolate the data associated with the different lateral regions LRa, LRb, LRc to determine field conditions within the portions of the field outside of the sensor's field of view (e.g., second sub-portions SP2 shown in FIG. 13). For instance, the field map module 216 may assume that the second sub-portions SP2 within the first lateral region LRa has the same or similar field condition(s) as in the first sub-portions SP1 within the first lateral region LRa, that the second sub-portions SP2 within the second lateral region LRb has the same or similar field condition(s) as in the first sub-portions SP1 within the second lateral region LRb, and/or that second sub-portions SP2 within the central lateral region LRc has the same or similar field condition(s) as in the first sub-portions SP1 within the central lateral region LRc. As such, the field map 250 generated may correlate a field condition(s) to each position within the swath based on the data generated by the sensor 152. The field map 250 may generally be used to control the operation of one or more components of the implement 10 and/or the work vehicle 12, as will be described below in greater detail, and/or may be used to control an operation of an implement performing a subsequent agricultural operation.

Referring back to FIG. 12, in some embodiments, the instructions 210 stored within the memory 206 of the computing system 202 may be executed by the processor(s) 204 to implement a performance module 220. In general, the performance module 220 may be configured to monitor the field condition data 212 deriving from the sensor(s) 152 to determine a performance of the implement 10. For instance, the performance module 220 may automatically analyze the field condition data 212 deriving from the sensor(s) 152 to determine whether the implement 10 is operating as expected. For instance, the performance module 220 may compare the data from the sensor(s) 152 to one or more associated thresholds for expected field conditions and determine an area-of-interest within the field when the data crosses such threshold(s). For example, the performance module 220 may monitor the surface roughness, clod size, residue coverage, and/or soil compaction of the field from data received from the sensor(s) 152 and determine an area-of-interest when the surface roughness, clod size, residue coverage, and/or soil compaction exceeds and/or drops below an associated threshold. In one embodiment, the computing system 202 may additionally, or alternatively, compare the field condition(s) within the different lateral regions LRa, LRb, LRc to each other and determine an area-of interest when the field condition(s) within one of the lateral regions LRa, LRb, LRc differs from the other lateral regions LRa, LRb, LRc by at least a given or predetermined amount. In some embodiments, the computing system 202 may additionally, or alternatively, receive an indication of such area-of-interest from an operator, e.g., via the user interface 60. In some instances, upon determining the location of the area-of-interest 306, the sensor 152 is configured to be automatically actuated such that its field of view 152A is directed towards the area-of interest. In some embodiments, the sensor 152 is configured to remain static while monitoring the area-of-interest. However, in other embodiments, the sensor 152 may be actuated back and forth such that the field of view 152A of the sensor 152 may oscillate while at least partially maintaining the area-of-interest within the field of view 152A. As such, the sensor 152 may generate additional data corresponding to the area-of-interest.

In some instances, data may additionally be captured for the same section of the field by a sensor(s) 152 directed forward of the implement 10 indicative of the field conditions before the agricultural operation has been performed by the implement 10 and by the sensor 152 after the agricultural operation has been performed. In such an embodiment, the performance module 220 may be configured to analyze the pre-operation and post-operation data to determine a field condition differential for the analyzed section of the field, which can additionally be used to assess the performance of the implement 10. For instance, data from the forward sensor(s) 152 may be used to detect the soil roughness of the portion of the field immediately in front of the vehicle 12 and/or implement 10 prior to working such portion of the field and the data from the aft sensor(s) 152 may be configured to detect the soil roughness of the same portion of the field immediately behind the implement 10 following the performance of the agricultural operation. The pre-operation soil roughness may then be compared to the post-operation soil roughness to assess the effectiveness of the implement 10 in performing the operation.

Additionally, in some embodiments, the instructions 210 stored within the memory 206 of the computing system 202 may be executed by the processor(s) 204 to implement a control module 222. In some embodiments, the control module 222 may be configured to adjust an operation of one or more components of the implement 10, the sensing assembly 150, and/or the user interface 60 based on the monitored field conditions. For instance, in some embodiments, the control module 222 may be configured to adjust the downforce acting on components of the implement 10 by controlling an operation of one or more of the implement actuators 38, 41, 50A, 54A to improve the field surface conditions based on the monitored field conditions and/or performance of the implement 10. For example, if one of the wing sections 28A, 28B is determined to be angled relative to the central frame section 28C based at least in part on the data generated by the sensor(s) 152, the control module 222 may control an operation of the wing actuator 38 associated with the respective frame section 28A, 28B to adjust the position of the frame. In some embodiments, the control module 222 may be configured to adjust the operation of the implement 10 based on an input from an operator, e.g., via the user interface 60. In one embodiment, the control module 222 may automatically control the actuation of the actuator 164 to move the sensor 152 according to a pattern and/or an area-of-interest, and/or may control the actuation of the actuator 164 based on an input from an operator, e.g., via the user interface 60. Additionally, or alternatively, in some embodiments, the computing system 202 may further be configured to control the operation of the user interface 60 to notify an operator of the field conditions, performance of the implement 10, and/or the like.

Moreover, as shown in FIG. 12, the computing system 202 may also include a communications interface 224 to provide a means for the computing system 202 to communicate with any of the various other system components described herein. For instance, one or more communicative links or interfaces (e.g., one or more data buses) may be provided between the communications interface 224 and the sensor(s) 152 to allow data transmitted from the sensor(s) 152 to be received by the computing system 202. Similarly, one or more communicative links or interfaces (e.g., one or more data buses) may be provided between the communications interface 224 and the user interface 60 to allow operator inputs to be received by the computing system 202 and to allow the computing system 202 to control the operation of one or more components of the user interface 60 to present field conditions to the operator.

Referring now to FIG. 14, a flow diagram of one embodiment of a method 300 for monitoring field conditions as an agricultural operation is performed within a field is illustrated in accordance with aspects of the present subject matter. In general, the method 300 will be described herein with reference to the implement 10 and the work vehicle 12 shown in FIGS. 1-3, as well as the sensing assembly 150 shown in FIGS. 3-11 and the various system components shown and described in FIGS. 12-13. However, it should be appreciated that the disclosed method 300 may be implemented with work vehicles and/or implements having any other suitable configurations, with sensing assemblies having any other suitable configurations, and/or within systems having any other suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (302), the method 300 may include controlling an operation of an actuator to actuate a sensor arm between a first position and a second position relative to an agricultural implement to which the sensor arm is pivotably coupled. For instance, as described above, the computing system 202 may be configured to control an operation of the sensor actuator 164 to actuate the sensor arm 154, 154', 154" between a first position (e.g., solid lined position in FIG. 5, 6, 7, 9, or 10) and a second position (e.g., dashed lined position in FIG. 5, 6, 7, or 9, or the position in FIG. 11) relative to the agricultural implement 10 such that a field of view 152A of the sensor 152 moves.

Further, at (304), the method 300 may include receiving data indicative of a field condition associated with a first lateral region of an aft portion of the field when the sensor arm is in the first position and a second lateral region of the aft portion of the field when the sensor arm is in the second position. For instance, as discussed above, the computing system 202 may be configured to receive data from the sensor 152 coupled proximate the second end of the sensor arm 154, 154', 154", where the data is indicative of a field condition associated with a first lateral region (e.g., aligned with the first frame section 28A along the direction of travel 14) of an aft portion of the field when the sensor arm 154, 154', 154" is in the first position (e.g., solid lined position in FIG. 5, 6, 7, 9, or 10) and a second lateral region (e.g., at least partially aligned with the second frame section 28B along the direction of travel 14) of the aft portion of the field when the sensor arm 154, 154', 154" is in the second position (e.g., dashed lined position in FIG. 5, 6, 7, or 9, or the position in FIG. 11), where the second lateral region is at least partially separate of the first lateral region along the lateral direction LT1, and where the aft portion of the field being disposed rearward of the agricultural implement 10 relative to the direction of travel 14 of the agricultural implement 10.

Additionally, at (306), the method 300 may include determining the field condition of at least the first and second lateral regions of the aft portion of the field based at least in part on the data. For example, as described above, the computing system 202 may determine the field condition(s) (e.g., soil roughness, clod sizes, crop residue coverage, soil compaction, soil moisture, tillage floor levelness, and/or the like) of at least the first and second lateral regions of the aft portion of the field based at least in part on the data generated by the sensor 152.

It is to be understood that, in several embodiments, the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the computing system 202 described herein, such as the method 300, are implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for monitoring field conditions, the agricultural system comprising:

an agricultural implement supporting a plurality of ground-engaging tools configured to engage a field to perform an agricultural operation as the agricultural implement moves across the field along a direction of travel;

a sensor configured to generate data indicative of a field condition associated with an aft portion of a field disposed rearward of the agricultural implement relative to the direction of travel of the agricultural implement;

a sensor arm extending between a first end and a second end, the sensor arm being pivotably coupled at a pivot joint proximate the first end to the agricultural implement such that the sensor arm is movable relative to the agricultural implement, the sensor arm being coupled proximate the second end to the sensor;

an actuator configured to actuate the sensor arm relative to the agricultural implement between a first position and a second position such that a field of view of the sensor is directed towards a first lateral region of the aft portion of the field when the sensor arm is in the first position and a second lateral region of the aft portion of the field when the sensor arm is in the second position, the second lateral region being at least partially separate of the first lateral region along a lateral direction; and a computing system, configured to:

control an operation of the actuator to actuate the sensor arm between the first and second positions;

receive the data generated by the sensor; and determine the field condition of at least the first and second lateral regions of the aft portion of the field based at least in part on the data generated by the sensor.

2. The agricultural system of claim 1, wherein the agricultural implement includes a first frame section and a second frame section, the first frame section being movable relative to the second frame section, the plurality of ground-engaging tools being supported on the first and second frame sections of the agricultural implement, wherein the sensor arm is coupled proximate the first end to the first frame section.

3. The agricultural system of claim 2, wherein the first lateral region of the aft portion of the field is at least partially aligned with the first frame section along the direction of travel and the second lateral region of the field is at least partially aligned with the second frame section along the direction of travel.

4. The agricultural system of claim 1, further comprising a rotational member, the rotational member being rotatably coupled to the agricultural implement about a rotational axis, the pivot joint pivotably coupling the sensor arm to the rotational member, the actuator being configured to rotate the rotational member about the rotational axis such that the sensor arm moves between the first and second positions.

5. The agricultural system of claim 4, wherein a radial distance between the pivot joint and the rotational axis is adjustable.

6. The agricultural system of claim 1, further comprising a fulcrum member coupled to the agricultural implement and the sensor arm at a location between the pivot joint and the second end.

7. The agricultural system of claim 6, wherein a distance between the pivot joint and the fulcrum member along the direction of travel is adjustable.

8. The agricultural system of claim 1, wherein the sensor arm is a first link of a parallel linkage assembly.

9. The agricultural system of claim 1, wherein the field of view of the sensor extends across a first width, the first width being less than a lateral width of the agricultural implement.

10. The agricultural system of claim 1, wherein the field condition comprises at least one of a surface roughness, clod size, residue coverage, soil compaction, soil composition, or a tillage floor.

11. An agricultural method for monitoring field conditions of a field during the performance of an agricultural operation by ground-engaging tools supported on an agricultural implement, the agricultural method comprising:

controlling, with a computing system, an operation of an actuator to actuate a sensor arm between a first position and a second position, the sensor arm extending between a first end and a second end, the sensor arm being pivotably coupled at a pivot joint proximate the first end to the agricultural implement such that the sensor arm is movable relative to the agricultural implement;

receiving, with the computing system, data generated by a sensor coupled to the sensor arm proximate the second end, the data being indicative of a field condition associated with a first lateral region of an aft portion of the field when the sensor arm is in the first position and a second lateral region of the aft portion of the field when the sensor arm is in the second position, the second lateral region being at least partially separate of the first lateral region along a lateral direction, the aft portion of the field being disposed rearward of the agricultural implement relative to a direction of travel of the agricultural implement; and determining, with the computing system, the field condition of at least the first and second lateral regions of the aft portion of the field based at least in part on the data generated by the sensor.

12. The agricultural method of claim 11, wherein the agricultural implement includes a first frame section and a second frame section, the first frame section being movable relative to the second frame section, the ground-engaging tools being supported on the first and second frame sections of the agricultural implement, the first lateral region of the aft portion of the field being at least partially aligned with the first frame section along the direction of travel and the second lateral region of the field being at least partially aligned with the second frame section along the direction of travel, wherein the sensor arm is coupled proximate the first end to the first frame section.

13. The agricultural method of claim 12, further comprising adjusting, with the computing system, an operation of one or more components of the agricultural implement based at least in part on the field condition of the at least the first and second lateral regions of the aft portion of the field.

14. The agricultural method of claim 13, wherein adjusting the operation of the one or more components of the agricultural implement comprises:

comparing, with the computing system, the field condition of the first lateral region and the field condition of the second lateral region to an expected field condition;

adjusting, with the computing system, the operation of the one or more components of the agricultural implement associated with the first frame section when the field condition of the first lateral region differs from the expected field condition by at least a predetermined amount; and adjusting, with the computing system, the operation of the one or more components of the agricultural implement associated with the second frame section when the field condition of the second lateral region differs from the expected field condition by at least a predetermined amount.

15. The agricultural method of claim 11, wherein controlling the operation of the actuator to actuate the sensor arm between the first position and the second position comprises controlling the operation of the actuator to oscillate the sensor arm between the first position and the second position.

16. The agricultural method of claim 11, further comprising a rotational member, the rotational member being rotatably coupled to the agricultural implement about a rotational axis, the pivot joint pivotably coupling the sensor arm to the rotational member, the actuator being configured to rotate the rotational member about the rotational axis such that the sensor arm moves between the first and second positions.

17. The agricultural method of claim 11, further comprising a fulcrum member coupled to the agricultural implement and the sensor arm at a location between the pivot joint and the second end.

18. The agricultural method of claim 11, wherein the sensor arm is a first link of a parallel linkage assembly.

19. The agricultural method of claim 11, wherein the field of view of the sensor extends across a first width, the first width being less than a lateral width of the agricultural implement.

20. The agricultural method of claim 11, wherein the field condition comprises at least one of a surface roughness, clod size, residue coverage, soil compaction, soil composition, or a tillage floor.

* * * * *